US011165692B2

(12) United States Patent
Singh et al.

(10) Patent No.: US 11,165,692 B2
(45) Date of Patent: Nov. 2, 2021

(54) PACKET FORWARDING USING VENDOR EXTENSION IN A SOFTWARE-DEFINED NETWORKING (SDN) SYSTEM

(71) Applicant: Telefonaktiebolaget LM Ericsson (publ), Stockholm (SE)

(72) Inventors: Ashish Singh, Fremont, CA (US); Atul Chowdhry, Fremont, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 107 days.

(21) Appl. No.: 16/303,136

(22) PCT Filed: May 25, 2016

(86) PCT No.: PCT/IB2016/053072
§ 371 (c)(1),
(2) Date: Nov. 19, 2018

(87) PCT Pub. No.: WO2017/203327
PCT Pub. Date: Nov. 30, 2017

(65) Prior Publication Data
US 2020/0204485 A1    Jun. 25, 2020

(51) Int. Cl.
*H04L 12/721* (2013.01)
*H04L 12/741* (2013.01)
(Continued)

(52) U.S. Cl.
CPC .............. *H04L 45/38* (2013.01); *H04L 45/54* (2013.01); *H04L 45/64* (2013.01); *H04L 69/22* (2013.01)

(58) Field of Classification Search
None
See application file for complete search history.

(56) References Cited

U.S. PATENT DOCUMENTS 7,080,051 B1 * 7/2006 Crawford .................. G06F 8/61
                                                        379/111
2013/0176850 A1    7/2013 Mishra et al.
(Continued)

FOREIGN PATENT DOCUMENTS

KR           101576518 B1    12/2015

OTHER PUBLICATIONS

Sonchack et al., Enabling Practical Software-defined Networking Security Applications with OFX, Feb. 21-24, 2016, NDSS '16 (Year: 2016).*
(Continued)

*Primary Examiner* — Ajit Patel
*Assistant Examiner* — Liem H. Nguyen
(74) *Attorney, Agent, or Firm* — Sage Patent Group

(57) ABSTRACT

Methods for packet forwarding using vendor extension in a software-defined networking (SDN) system are disclosed. In one embodiment, a method is implemented in an electronic device in a SDN system, where the electronic device serves as a network element. The method includes receiving a packet for forwarding, and determining that the packet matches a flow table entry of a flow table in the network element. The method continues with performing operations on the packet based one or more instructions of the flow table entry, where the one or more instructions contains an experimenter that matches a vendor extension identifier of a vendor extension table of the network element. Additionally, each vendor extension identifier of the vendor extension table identifies a set of function pointers for a set of functions, and the operations include execution of one or more of the set of functions.

20 Claims, 8 Drawing Sheets

(51) Int. Cl.
  *H04L 12/715* (2013.01)
  *H04L 29/06* (2006.01)
  *H04L 29/08* (2006.01)

(56) References Cited

U.S. PATENT DOCUMENTS

| | | | | |
|---|---|---|---|---|
| 2013/0266007 | A1* | 10/2013 | Kumbhare | H04L 45/56 370/389 |
| 2014/0357976 | A1* | 12/2014 | Pitre | A61B 5/7264 600/407 |
| 2015/0131667 | A1* | 5/2015 | Ko | H04L 45/745 370/392 |
| 2015/0131997 | A1* | 5/2015 | Syed | H04Q 11/0066 398/69 |
| 2015/0172077 | A1* | 6/2015 | Yoshida | H04L 12/4641 370/401 |
| 2015/0207724 | A1* | 7/2015 | Choudhury | H04L 45/42 370/255 |
| 2016/0142301 | A1 | 5/2016 | Anand | |
| 2016/0234068 | A1* | 8/2016 | Dolganow | H04L 47/2483 |
| 2016/0248860 | A1* | 8/2016 | Dunbar | H04L 67/146 |
| 2016/0277297 | A1* | 9/2016 | Chang | H04L 45/54 |
| 2016/0285750 | A1* | 9/2016 | Saquib | H04L 43/026 |
| 2016/0350095 | A1* | 12/2016 | Ramachandran | H04L 41/0213 |
| 2017/0041234 | A1* | 2/2017 | Lin | H04L 47/125 |
| 2017/0118113 | A1* | 4/2017 | Vemulapalli | G06F 13/102 |
| 2018/0227224 | A1* | 8/2018 | Bhaskar | H04L 45/745 |

OTHER PUBLICATIONS

"Open Flow Switch Specification, Version 1.3.1 (Wire Protocol Ox04)", Open Networking Foundation, Sep. 6, 2012, 128 pages.
"OpenFlow Switch Specification, Version 1.3.5 (Protocol version 0X04)", Open Networking Foundation, Mar. 26, 2015, 177 pages.
Open Networking Foundation, "OpenFlow Switch Specification", Version 1.3.2 (Wire Protocol 0x04), Apr. 25, 2013, 131 pages.
Flowgrammable, Vendor—Experimenter, OpenFlow 1.1, 3 pages, http://flowgrammable.org/sdn/openflow/message-layer/vendorexperiment/#tab_ofp_1_1, accessed Jun. 25, 2020.

* cited by examiner

200

| | |
|---|---|
| Load a vendor extension in the form of dynamic linked library in a network element (e.g. Openflow switch). | — 202 |
| ↓ | |
| Initiate an initialization function to get a set of function pointers for a set of functions for the vendor extension. | — 204 |
| ↓ | |
| Store the set of function pointers in a table indexed by vendor extension identifiers (IDs). | — 206 |

FIG. 2A

Vendor Extension Table 210

| | |
|---|---|
| vendor Extension ID1 212 | Function Pointer 1 (match field) 214 |
| | Function Pointer 2 (Instruction) 216 |
| | Function Pointer 3 (action) 218 |
| | ⋮ |
| vendor Extension ID2 222 | Function Pointer 6 (match field) 224 |
| | Function Pointer 7 (Instruction) 226 |
| | Function Pointer 8 (action) 228 |
| | ⋮ |
| ⋮ | ⋮ |
| vendor Extension IDn 232 | Function Pointer k (match field) 234 |
| | Function Pointer k+1 (Instruction) 236 |
| | Function Pointer k+2 (action) 238 |
| | ⋮ |

FIG. 2B

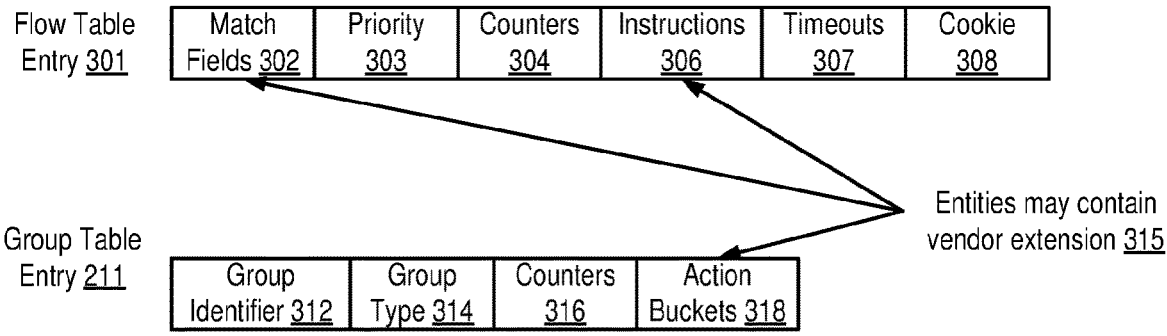

FIG. 3A

Experimenter instruction type defined 325

```
enum ofp_instruction_type {
    OFPIT_GOTO_TABLE = 1, /* Setup the next table in the lookup pipeline */
    OFPIT_WRITE_METADATA = 2, /* Setup the metadata field for use later in pipeline */
    OFPIT_WRITE_ACTIONS = 3, /* Write the action(s) onto the datapath action set */
    OFPIT_APPLY_ACTIONS = 4, /* Applies the action(s) immediately */
    OFPIT_CLEAR_ACTIONS = 5, /* Clears all actions from the datapath action set */
    OFPIT_METER = 6, /* Apply meter (rate limiter) */
    OFPIT_EXPERIMENTER = 0xFFFF /* Experimenter instruction */
};
```

FIG. 3B

Use experimenter ID as a vendor extension ID 335

```
/* Instruction structure for experimental instructions */
struct ofp_instruction_experimenter {
    uint16_t type; /* OFPIT_EXPERIMENTER */
    uint16_t len; /* Length of this struct in bytes */
    uint32_t experimenter; /* Experimenter ID which takes the same form as in struct ofp_experimenter_header. */

/* Experimenter-defined arbitrary additional data. */
};
OFP_ASSERT(sizeof(struct ofp_instruction_experimenter) == 8);
```

FIG. 3C

PACKET FORWARDING USING VENDOR EXTENSION IN A SOFTWARE-DEFINED NETWORKING (SDN) SYSTEM

CROSS-REFERENCE TO RELATED APPLICATIONS

This application is a National stage of International Application No. PCT/IB2016/053072, filed May 25, 2016, which is hereby incorporated by reference.

FIELD OF INVENTION

The embodiments of the invention are related to the field of networking. More specifically, the embodiments of the invention relate to systems, method, node, and computer program for packet forwarding using vendor extension in a software-defined networking (SDN) system.

BACKGROUND

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

However, current SDN standard-based implementation also suffer from shortcomings. While SDN protocols such as OpenFlow™ do present valid ways to specify a model for packet processing, a problem exists in that it is very hard to extend or customize this model according to particular routing needs. For example, adding support for new protocols requires proposing changes to the OpenFlow™ specification, hoping for adoption, and waiting for implementation. Such changes involve modifying the parsing of packets (e.g., in searching for matching fields) and the performing actions on the packets.

It is challenging to utilize a standard-based SDN implementation to meet ever-changing customer need efficiently and not deviate from the existing SDN standards.

SUMMARY

Methods for packet forwarding using vendor extension in a software-defined networking (SDN) system are disclosed. In one embodiment, a method is implemented in an electronic device in a SDN system, where the electronic device serves as a network element in the SDN system. The method includes receiving a packet for forwarding, and determining that the packet matches a flow table entry of a flow table in the network element. The method continues with performing operations on the packet based one or more instructions of the flow table entry, where the one or more instructions contains an experimenter that matches a vendor extension identifier of a vendor extension table of the network element. Additionally, each vendor extension identifier of the vendor extension table identifies a set of function pointers for a set of functions, and the operations include execution of one or more of the set of functions.

Apparatus for packet forwarding using vendor extension in a software-defined networking (SDN) system are disclosed. In one embodiment, an electronic device serving as a network element in the SDN system is disclose. The electronic device includes a processor and a non-transitory machine-readable storage medium that coupled to the processor, the non-transitory machine-readable storage medium containing instructions, which when executed by the processor, cause the electronic device to receive a packet for forwarding, determine that the packet matches a flow table entry of a flow table in the network element, and perform operations on the packet based one or more instructions of the flow table entry, where the one or more instructions contains an experimenter that matches a vendor extension identifier of a vendor extension table of the network element. Each vendor extension identifier of the vendor extension table identifies a set of function pointers for a set of functions, and the operations include execution of one or more of the set of functions.

Non-transitory machine-readable storage media for packet forwarding using vendor extension in a software-defined networking (SDN) system are disclosed. In one embodiment, a non-transitory machine-readable storage medium is disclosed. The non-transitory machine-readable storage medium has instructions stored therein, which when executed by a processor, cause the processor to perform operations in an electronic device in a SDN system, where the electronic device serves as a network element in the SDN system. The operations include: receiving a packet for forwarding and determining that the packet matches a flow table entry of a flow table in the network element, and performing operations on the packet based one or more instructions of the flow table entry, where the one or more instructions contains an experimenter that matches a vendor extension identifier of a vendor extension table of the network element. Each vendor extension identifier of the vendor extension table identifies a set of function pointers for a set of functions, and the operations include execution of one or more of the set of functions.

Embodiments of the disclosed techniques provides efficient ways to utilize existing SDN standards and forward packets based on a vendor defined extension.

BRIEF DESCRIPTION OF THE DRAWINGS

The invention may best be understood by referring to the following description and accompanying drawings that are used to illustrate embodiments of the invention. Like reference numbers and designations in the various drawings indicate like elements. In the drawings:

FIG. 2A is a flow diagram illustrating the formation of a vendor extension table according to one embodiment of the invention.

FIG. 2B illustrates an exemplary vendor extension table according to one embodiment of the invention.

FIG. 3A illustrates a flow table entry containing vendor extension according to one embodiment of the invention.

FIG. 3B illustrates how experimenter instruction type is defined.

FIG. 3C illustrates instruction structures for experimental instructions.

DETAILED DESCRIPTION

Figure 1:
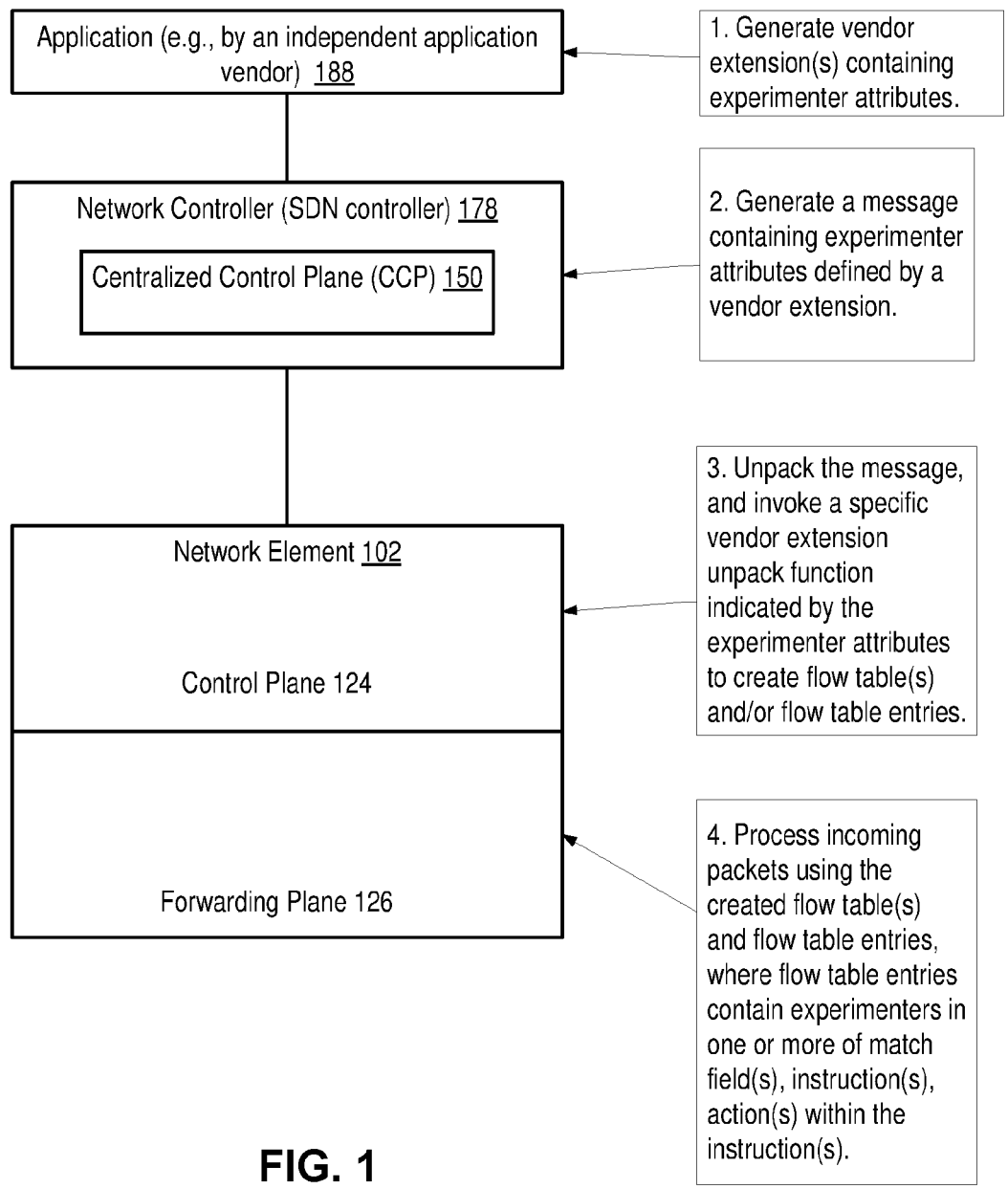
FIG. 1 illustrates implementation of vendor extension according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random-access memory (DRAM), static random-access memory (SRAM)) of that electronic device. Typical electronic devices also include a set or one or more physical network interface(s) to establish network connections (to transmit and/or receive code and/or data using propagating signals) with other electronic devices.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). A node, such as a radio node, a backhaul node, or a core node, includes one or more network devices. As discussed herein below in relation to FIGS. 7-8, a network device may implement a set of network elements in some embodiments; and in alternative embodiments, a single network element may be implemented by a set of network devices.

SDN System and Vendor Extension Implementation

Protocols have been proposed to implement a software-defined networking (SDN) system. These protocols are designed to manage and direct traffic among network devices (e.g., routers and switches) which separate the programming of network devices from underlying hardware. For example, OpenFlow™ (OF) is defined by the Open Network Foundation (ONF) has been a widely recognized protocol for SDN implementation. In the OpenFlow™ protocols, a network element that forwards packet is an OpenFlow™ switch (or simply switch), and switches perform packet forwarding with management of a SDN controller.

In the OpenFlow™ protocols, mechanisms have been provided so that an independent application vendor (one is different than that of which provides the switch) may define vendor extension by adding new experimenter messages, instructions, matches, actions etc. However, existing implementations support these vendor extensions statically, i.e. a new extension will have to be implemented inside the switch software and new code image will have to be built and loaded onto the switches in order to support the new vendor extension. Thus, the independent application vendor has to require the switch operator/vendor to implement the independent application vendor's proprietary extension into the switch software, thus such implementation has to depend on switch operator/vendor release timeline. Such implementation typically results in extra cost and introduces significant delay in rolling out the vendor extension based solution.

Thus, for the OpenFlow™ protocols and other standard-based SDN protocols, it is desirable to for the switch operator/vendor to provide a software development kit (SDK) that can be used by independent application vendors to implement proprietary extensions on their owns. Application vendors then will be able to build dynamically linked shared object libraries and download them on the switches, which provide a mechanism to load these vendor extensions in real-time and at the time packets are to be processed. By doing so, application vendors may be able to load new vendor extensions based on their schedule and the loading will not have any traffic impact on the switch. Thus the application vendors may be able to roll out their vendor extension-based solution without depending on switch operator/vendor's release timelines.

FIG. 1 illustrates implementation of vendor extension according to one embodiment of the invention. The SDN system 100 includes an application 188, a network controller 178, and a network element 102. FIGS. 8A-F and 9 provide a more detailed description of a SDN system according to embodiments of the invention, and FIG. 1 focuses only on the entities most relevant to the implementation of vendor extension. Task boxes 1-4 illustrate the order in which operations are performed according to one embodiment of the invention. While embodiments of the invention apply to generic SDN system, the operations described herein utilize terms in the OpenFlow™ standards for simplicity of explanation. These terms, such as flow table entry, group table entry, flow/group modify message, PACKET_OUT message, are well known terms in the art (see for example, "OpenFlow Switch Specification", version 1.3.5, dated Mar. 26, 2015, by the Open Network Foundation) and their definitions are not repeated herein.

The application 188 is an application provided by an independent application vendor in one embodiment, where the independent application vendor is independent of the switch vendor. The network controller 178 contains a centralized control plane (CCP) 150 that coordinates packet forwarding of network element 102 according to one embodiment of the invention.

The network element 102 contains a control plane 124 and a forwarding plane 126 according to one embodiment of the invention. The control plane 124 is responsible for connection with the network controller 178, unpacking messages (e.g., OpenFlow™ messages) coming from the network controller 178 into local structures (which is easier to use); packing the messages going toward the network controller 178 from the local structures; and programming the forwarding plane 126 for packet forwarding. Forwarding plane 126 is responsible for forwarding traffic after applying actions as per flow table and group table entries in the flow path of the network element, maintaining the traffic statistics for forwarding entities (e.g., port, flow/group table, flow/group table entry, etc.), and sending received packets out of an port or punting the packets toward the control plane 124. It is to be noted that the control plane 124 and forwarding plane 126 may run as different modules or be integrated into a single module.

At task box 1, the application 188 generates one or more vendor extensions each containing one or more experimenter attributes. SDNs protocol such as the OpenFlow™ protocol (including sets of protocols for SDN controller and switch) provide a mechanism to define a vendor extension by extending any of the following categories: (1) messages; (2) multi-part messages; (3) instructions; (4) matches; (5) actions; and (6) meter bands. An experimenter attribute in a vendor extension may be applied to either a control plane or a forwarding plane, so an experimenter attribute may be denoted specified for control plane or forwarding plane.

The application vendor (independent of the switch manufacturer or not) may utilize a software development kit (SDK) for generating a vendor extension. The SDK provides vendors the required header files and application programming interfaces (APIs). Some of the APIs includes: (1) APIs to retrieve information and statistics associated with the forwarding entities; (2) APIs to iterate the database related to the forwarding entities; (3) APIs to send message between the control plane software and forwarding plane software; and (4) APIs to send and receive messages to and from the network controller.

Typically, an application of the SDN system send messages (with or without experimenter attributes) to the network element with the involvement of the network controller 178. However, an application may load vendor extension libraries (such as dynamically linked shared object libraries) to the network element directly in one embodiment.

At task box 2, the network controller 178 (through the centralized control plane 150 in one embodiment) generates a message containing the experimenter attributes defined by a vendor extension. The message is then sent to the control plane 124.

At task box 3, the control plane 124 unpacks the message, and invokes a specific vendor extension unpack function indicated by the experimenter attribute in the message to create flow table(s) and/or one or more flow table entries. In some cases, group table entries are created instead. In some other cases, no forwarding entries such as flow/group entries are created but an action is determined to process packets (either from another network element or the SDN controller) based on experimenter attribute of the message.

At task box 4, the forwarding plane 126 processes incoming packets using the created flow table(s) and/or one or more flow table entries, where the flow table entries contain one or more experimenters in one or more of match field(s), instruction(s), action(s) within the instruction(s), and action set.

In one embodiment, the experimenter attributes defined by a vendor extension are construed in reference to a vendor extension table, which results in the desired packet processing in the forwarding plane 126.

Vendor Extension Table

FIG. 2A is a flow diagram illustrating the formation of a vendor extension table according to one embodiment of the invention. Method 200 is performed in a network element for forwarding packets in a SDN system according to one embodiment of the invention. In one embodiment, the network element comprises an OpenFlow™ switch.

At reference 202, the network element loads a vendor extension in the form of dynamic linked library in memory. The network element may specify the vendor extension by providing a vendor extension name, vendor extension identifier, and a path of the vendor extension dynamic linked shared object library such as .so in Linux. The vendor extension may be for control plane and/or the forwarding plane software.

Then at reference 204, the network element initiates an initialization function to get a set of function pointers for a set of functions for the vendor extension. A function pointer may point to an address to invoke a corresponding function in one embodiment. In one embodiment, the control plane and/or the forwarding plane software gets the set of function pointers for their respective library's initialization function in the form of <vendor_extension_name>_control_init and <vendor_extension_name>_data_init respectively and then invoke it. The control plane and/or the forwarding plane software then will pass a structure with SDK API set as an input to the initialization function, and vendor extension can store the set of function pointers (e.g., the SDK API function pointers) and use them when needed. Afterward, the initialization function will return a structure with the set of functions that the vendor extension has implemented.

At reference 206, the network element stores the set of function pointers in a table indexed by vendor extension identifiers (IDs). In one embodiment, the control plane and/or the forwarding plane software will store the returned structure from reference 204 in the table indexed by vendor extension IDs, and we refer the table to be a vendor extension table. Through the vendor extension table, the set of functions may be invoked through the set of function pointers to realize experimenter procedures required for a given vendor extension.

FIG. 2B illustrates an exemplary vendor extension table according to one embodiment of the invention. The vendor extension table 210 may be formed through method 200. Within the vendor extension table, the searching key is the vendor extension IDs. Each vendor extension ID corresponds to a set of function pointers, and each pointer is used for invoking a function. For example, vendor extension ID1 at reference 202 corresponds to function pointer 1, which is for match field at reference 214; function pointer 2, which is for instruction at reference 216; function pointer 3, which is for action at reference 218. The rest of vendor extension table 210 is organized similarly and vendor extension table 210 may simultaneously store a plurality of vendor extensions from a plurality of vendors, and each vendor may generate a plurality of vendor extensions too.

The set of functions for vendor extension ID1 may include more than the illustrated three function pointers, and each function pointer is for invoking a particular function defined by the vendor extension, where the vendor extension is generated by the vendor. While each vendor extension ID in a vendor extension (e.g., vendor extension table 210) may correspond to the same types of function pointers (e.g., match field, instruction, action as illustrated in vendor extension table 210), a vendor extension may have less than full set of types of functions to be invoked. In that case, that type of function pointer will be null. For example, vendor extension ID1 at reference 212 may correspond function pointer 2 at 216 and function pointer 3 at 218 being null, thus the vendor extension ID1 has only one valid function pointer 1 at reference 214 for match field in that case.

It is to be noted while the vendor extension table is illustrated in a table form, the relationship between the vendor extension IDs and corresponding function pointers may be kept in a variety of other data structures, such as map, list, array, file, database (relational database or mongo database), etc. Further, the illustration of columns and rows within these tables is arbitrary; while one implementation may choose to put entries in rows it is trivial to modify the data structure to put entries in columns instead.

OpenFlow Examples

As the OpenFlow™ protocols is well known in the art of SDN system, using it to illustrate implementation of vendor extension may be helpful in understanding the techniques described herein. FIGS. 3A-C illustrates entities defined in the OpenFlow™ protocols and how they are used for vendor extension.

FIG. 3A illustrates a flow table entry containing vendor extension according to one embodiment of the invention. A flow table entry 301 in the OpenFlow™ protocols includes the following entities:

Match fields 302: To match against packets. These comprise the ingress port and packet headers, and optionally metadata specified by a previous table.
Priority 303: Matching precedence of a flow entry.
Counters 304: Updated when packets are matched.
Instructions 306: To modify the action set or pipeline processing.
Timeouts 307: Maximum amount of time or idle time before flow is expired by the network element.
Cookie 308: Opaque data value chosen by the network controller. May be used by the controller to filter flow statistics, flow modification, and flow deletion.

An application vendor may want to define its specific way to match fields against packets, thus the application vendor may generate a vendor extension for match fields 302 according to one embodiment of the invention. The same vendor or a different one may want to define its specific way to perform instructions, thus it may generate the same vendor extension or a different one for instructions 306 according to one embodiment of the invention. In the OpenFlow™ protocol, the instructions 306 may specify an operation to perform (e.g. go to next table, update metadata, apply actions, update action set or metering) An experimenter instruction may contain (1) a new experimenter instruction to perform an operation or (2) a METER instruction with a new experimenter meter band type, and it may specify (3) a new experimenter action as part of APPLY_ACTIONS or WRITE_ACTIONS instruction. That is, match fields 302 and instruction 306 are the entities that may contain vendor extension as illustrated with reference 315 according to one embodiment of the invention.

In addition, the OpenFlow™ protocol also defines group table, which contains group table entries. A group table entry 311 contains:

Group identifier 312: A numeric number (e.g., a 32-bit unsigned integer) uniquely identifying a group.
Group type 314: To determine group semantics.
Counters 316: Updated when packets are processed by a group.
Action buckets 318: An ordered list of action buckets, where each action bucket contains a set of actions to execute and associated parameters A group table may be identified by a group identifier. Through the action buckets, a group table entry generally allows the packets of a matching flow to be forwarded to: a random port on a group of ports (for load-balancing), a first live port on a group of ports (for failover), and all ports on a group of ports (for multicasting). Using an experimenter action buckets 318 may specify a new experimenter action other than the ones defined by the OpenFlow™ Protocol. That is, the action buckets 318 are the entities that may contain vendor extension as illustrated with reference 315 according to one embodiment of the invention.

Furthermore, the messages coming from a SDN controller, such as PAKCET_OUT message, may also contain experimenter action.

FIG. 3B illustrates how experimenter instruction type is defined. In this example, the instruction type value for an experimenter instruction is defined as hexadecimal FFFF. Thus, once a switch forwarding plane parses an instruction with instruction type 0xFFFF, the instruction is treated as an experimenter instruction as illustrated with reference 325. Other than the illustrated experimenter instruction, other defined experimenter objects in the OpenFlow™ protocol include experimenter match field, meter instruction with an experimenter meter band type, and experimenter action.

Once a switch determines an experimenter object, it checks the experimenter object and determines how to perform operations. As discussed, the experimenter object includes one or more of an experimenter match field, an experimenter instruction, a METER instruction with an experimenter meter band type, and an experimenter action.

FIG. 3C illustrates instruction structures for experimental instructions. When the experimenter object is an instruction and the instruction type is experimenter through the instruction type illustrated in FIG. 3B (often referred to the instruction having an experimenter attribute), it checks the experimenter's instruction and determine how to perform operations. The experimenter instruction includes an experimenter ID, which takes the same form as struct of p_experimenter_header as explained in the illustrated pseudo code. In one embodiment, the experimenter ID is treated as a vendor extension ID, which can be used by the switch to look up the vendor extension table (e.g. the vendor extension table 210) as illustrated in FIG. 2B. If the switch finds a vendor extension ID matches the experimenter ID (say the vendor extension ID2 222 matches the experimenter ID), the corresponding function pointer for instruction (function pointer 7 at reference 226 in this example) is used to invoke a corresponding function.

The application vendor can specify a vendor extension ID as an experimenter ID for an experimenter object, and the switch may use a vendor extension table to look up and find the matching vendor extension ID and perform the functions specified by a set of function pointers corresponding to the matching vendor extension ID in the vendor extension table.

Programming Forwarding Plane

Figure 4:
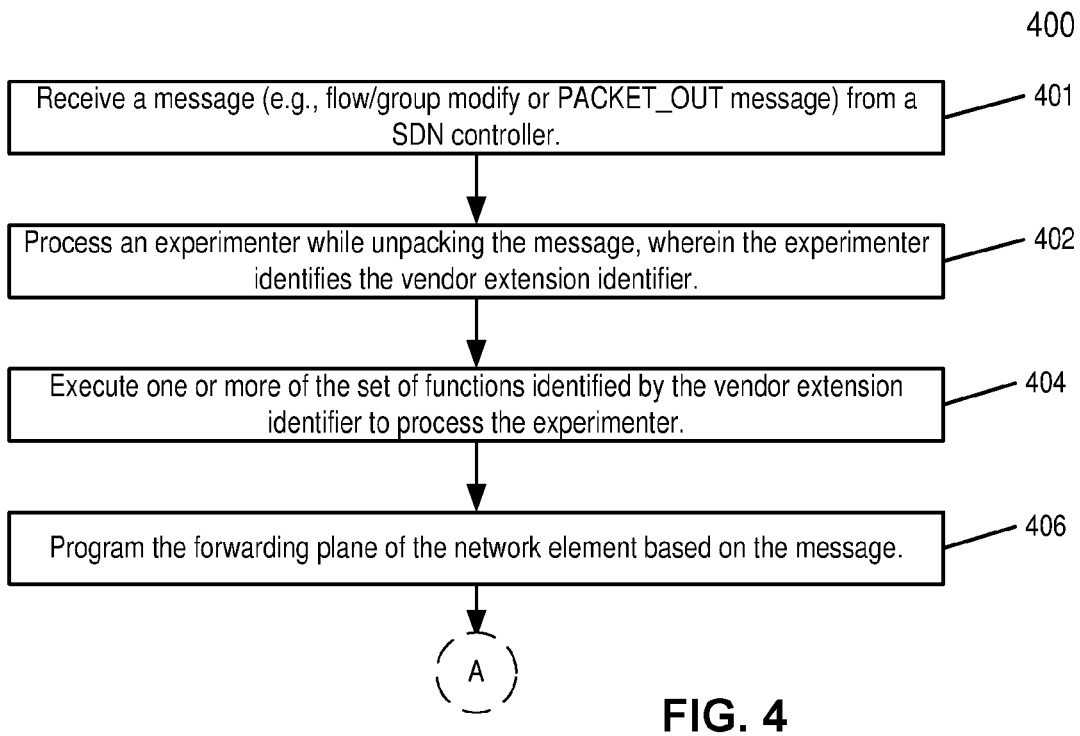
FIG. 4 is a flow diagram illustrating programming forwarding plane based on vendor extension according to one embodiment of the invention.

FIG. 4 is a flow diagram illustrating programming forwarding plane based on vendor extension according to one embodiment of the invention. Method 400 may be implemented in a network element of a SDN system. In one embodiment, the network element is an OpenFlow™ switch.

At reference 401, a message is received from a SDN controller that manages the network element. The message is one of a flow modify message (referred to as FLOW_MOD), group modify message (referred to as GROUP_MOD), or a PACKET_OUT message defined in the OpenFlow™ protocol.

At reference 402, the network element processes an experimenter (which is included in the experimenter attribute) while unpacking the message. The experimenter identifies a vendor extension identifier as described herein above.

At reference 404, the network element executes one or more of the set of functions identified by the vendor extension identifier to process. Then at reference 406, the network element programs the forwarding plane of the network element based on the message.

In one embodiment, the vendor implements pack and unpack functions for the experimenter for the network element to process the experimenter. The control plane software then uses the unpack functions for any experimenter it parses and uses the unpacked data as opaque vendor data without having understanding of it. This opaque vendor data will be passed to the forwarding plane software as a part of a match set, an instruction set, or an action set in the internal switch APIs for the flow modify message, group modify message, or PACKET_OUT.

For handling experimenter metering band in the OpenFlow™ protocol, an application vendor may define defines experimenter metering band types apart from standard rate limiters/policers of types DROP and DSCP_REMARK in one embodiment. Control Plane software will invoke the experimenter metering band type unpack function while unpacking the METER_MOD message and use unpacked experimenter data as opaque vendor data. This opaque vendor data will be passed to the forwarding plane software as part of band set in the internal switch APIs for METER_MOD.

For implementing processing functions for experimenter messages and multi-part messages in the OpenFlow™ protocol, an application vendor may implement an OpenFlow™ message processing function to be invoked by the switch's control plane software after unpacking a message. This function performs the required control plane processing and sends an experimenter message to the forwarding plane software using a SDK API if needed. Additionally, when processing requires a response from the forwarding plane software, an application vendor implements a forwarding plane response processing function to be invoked by switch control plane software after getting an experimenter response from the forwarding plane software. The functions such as the OpenFlow™ message processing function and forwarding plane response processing function may send a message to the SDN controller using a SDK API in one embodiment.

For implementing an initialization function in the OpenFlow™ protocol, an application vendor may implement the initialization function with a fixed format, such as <vendor_extension_name>_control_init for the control plane software in one embodiment. The control plane software then will pass a structure with SDK API set as an input to the initialization function, and the initialization function returns a structure with a set of all functions that the vendor extension has implemented in one embodiment. Vendor extension can store the associated set of SDK API function pointers upon initialization and use the set of function pointers when needed.

In the forwarding plane, the application vendor may implement one or more functions to process experimenter control message. When the forwarding plane receives any experimenter message, it will invoke the one or more functions to process the experimenter message, where the one or more functions can use the provided SDK APIs in order to do the required processing. If the processing requires sending an experimenter response back to the control plane software, it forms the response and send it using the provided SDK API.

Additionally, the application vendor may implement an initialization function in the forwarding plane in one embodiment, where the initialization function may be implemented with a fixed format, such as <vendor_extension_name>_data_init. The forwarding plane software will pass a structure with SDK API set as an input to the initialization function, and a vendor extension may store the associated set of SDK API function pointers and use them when needed. This initialization function will return a structure with the set of all functions that the vendor extension has implemented.

Packet Forwarding

Figure 5:
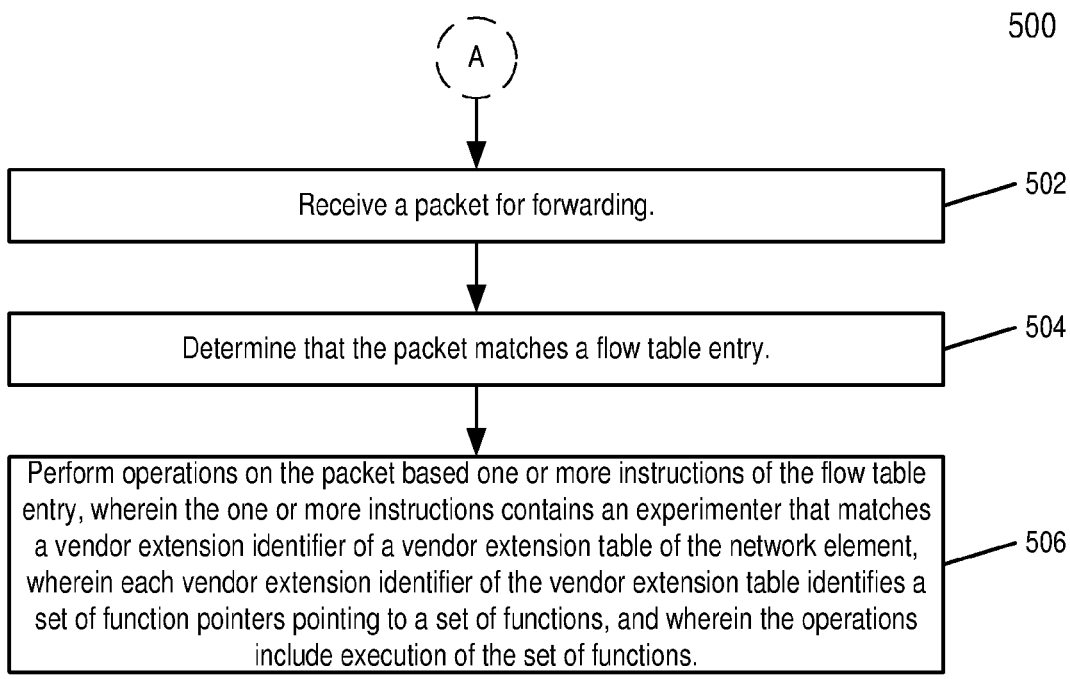
FIG. 5 illustrates packet forwarding using vendor extension in a network element of a SDN system according to one embodiment of the invention.

Once the forwarding plane of the network element is programmed, the forwarding plane is ready for forwarding packet. FIG. 5 illustrates packet forwarding using vendor extension in a network element of a SDN system according to one embodiment of the invention. Method 500 is a continuation of method 400 in one embodiment, and similarly method 500 may be implemented in a network element of a SDN system. In one embodiment, the network element is an OpenFlow™ switch.

At reference 502, the network element receives a packet for forwarding. At reference 504, the network element determines that the packet matches a flow table entry of a flow table in the network element. At reference 506, the network element performs operations on the packet based on one or more instructions of the flow table entry. The one or more instructions contains an experimenter that matches a vendor extension identifier of a vendor extension table of the network element, where each vendor extension identifier of the vendor extension table identifies a set of function pointers for a set of functions, and wherein the operations include execution of one or more of the set of functions.

Figure 6:
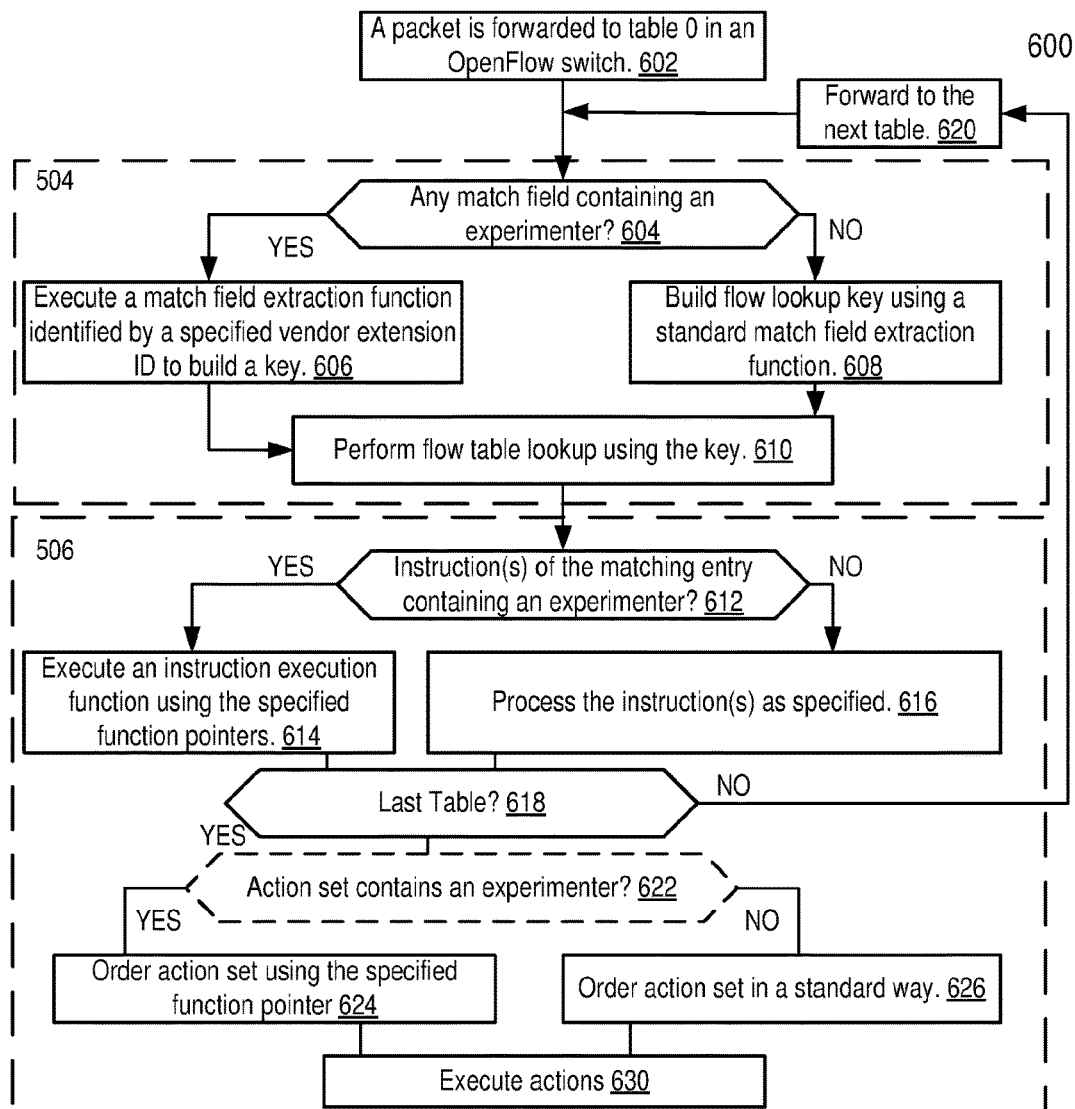
FIG. 6 illustrates packet forwarding using vendor extension in an OpenFlow™ switch according to one embodiment of the invention.

The packet forwarding can be explained in more details for a SDN system in compliance with the OpenFlow™ protocol. FIG. 6 illustrates packet forwarding using vendor extension in an OpenFlow™ switch according to one embodiment of the invention. It is to be noted that the operations may be performed by a network element of a SDN system other than an OpenFlow™ switch.

At reference 602, a packet is forwarded to flow table 0 in an OpenFlow™ switch. Then at reference 604, it is determined whether any match field contains an experimenter. If the match fields contain an experimenter, the method 600 goes to reference 606, where the switch builds a flow lookup key by executing a match field extraction function identified by a specified vendor extension ID. The specified vendor extension ID is specified by the experimenter. The match field extraction function is identified through looking up the vendor extension ID table (e.g., the vendor extension table 210 in FIG. 2B) and identify the vendor extension ID matching the experimenter. Upon the matching, the function pointer for match field (e.g., referring to FIG. 2B, upon matching vendor extension ID1 at reference 212, the function pointer 1 for match field at reference 214) is selected to invoke the match field extraction function. That is, upon determining that match fields in the flow table includes the experimenter, the one or more of the set of functions identified by the vendor extension identifier is executed for extracting match fields from the packet. Then at reference 610, the switch performs flow table lookup using the key. That is, the switch determines that match fields in the flow table includes the experimenter, then upon matching the experimenter with the vendor extension identifier of the vendor extension table, the switch executes one or more of the set of functions identified by the vendor extension identifier for extracting match fields from the packet.

If the match fields do not contain an experimenter, the method 600 goes to reference 608, where the switch builds a flow lookup key using a standard match field extraction function following the OpenFlow™ protocols. Afterward the method 600 goes to reference 610 also. It is to be noted that operations in references 604-610 represent an embodiment of reference 504 of FIG. 5 as illustrated with the dotted block in FIG. 6.

If the packet does not match with any flow table entry within the table, the process ends, and the packet is either dropped, buffered, or punted to the SDN controller in one embodiment. If the packet is matched with a flow table entry, the method 600 goes to reference 612.

At reference 612, it is determined if an instruction of the matching flow table entry contains an experimenter. If the instruction of the matching flow table entry contains an experimenter, the experimenter specifies a vendor extension ID. Through looking up the vendor extension ID table and identifying the vendor extension ID matching the experimenter, the network element identifies a set of functions through a set of function pointers, and the network element executes an instruction execution function using a function pointer within the set of function pointers (e.g., function pointer 7 for instruction at reference 226 in FIG. 2B when vendor extension ID2 at reference 222 matches the experimenter). In other words, the network element determines that within the flow table entry, an instruction contains an experimenter, and then executes one or more of a set of functions identified by the vendor extension identifier matching the experimenter.

If at reference 612, it is determined that no instruction of the matching flow table entry contains an experimenter, the method 600 goes to reference 616, and the network element processes the instruction or instructions of the flow table entry as specified. However, the instruction and instructions of the flow table entry may specify an action, or a meter instruction, and any one of them may contain an experimenter, and the operations within reference 612 thus worth more exploration wherein below. It is to be noted that operations in references 612-616 represent an embodiment of reference 506 of FIG. 5 as illustrated with the dotted block in FIG. 6.

Once the packet is processed through either reference 614 or 616, the method 600 goes to reference 618, which determine whether the flow table is the last table. It is not, the method goes to reference 620, which forwards the packet to the next table. If the table is the last table and action set contains one or more actions, the method goes to reference 622, otherwise, the packet processing for the packet completes. At reference 622, the switch determines if the action set contains an experimenter. If it does, the method goes to reference 624, where the switch orders or re-orders the action set using the specified function pointer. In other words, upon the switch determines that the flow table entry is within the last flow table of the pipeline and that an action set contains an experimenter, the switch orders or reorders actions within the action set by executing one or more of the set of functions identified by the vendor extension identifier matching the experimenter in the vendor extension table. If it does not, the method goes to reference 626, and the switch orders the action set in a standard way. After the order or reorder of the action set, the switch executes the actions in the action set at reference 630.

Figure 7:
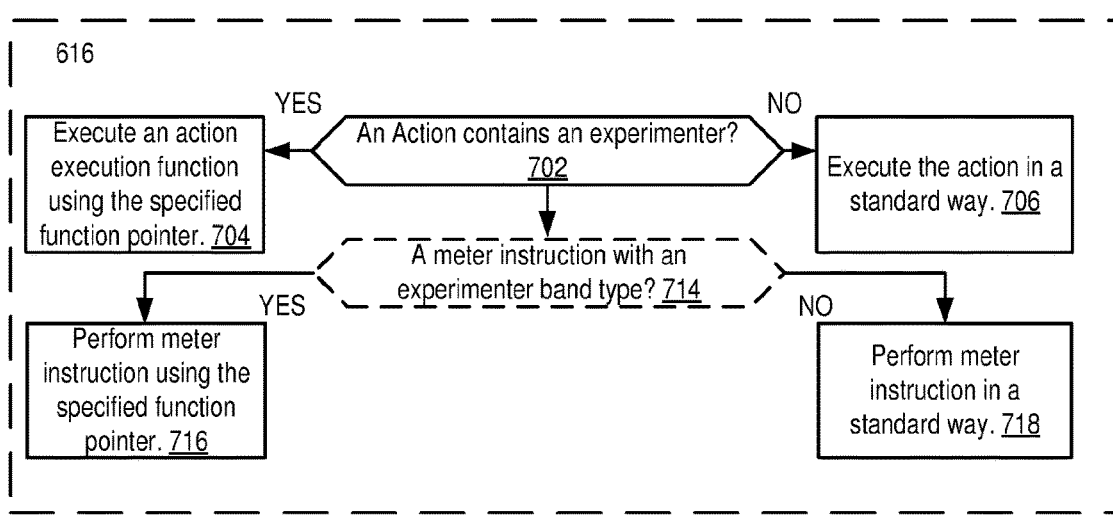
FIG. 7 illustrates processing an instruction of a flow table entry using vendor extension in an OpenFlow™ switch according to one embodiment of the invention.

FIG. 7 illustrates processing an instruction of a flow table entry using vendor extension in an OpenFlow™ switch according to one embodiment of the invention. In one embodiment, method 700 is an embodiment of reference 616.

When processing an APPLY_ACTIONS instruction in flow table entry or action bucket in group table entry or action list in PACKET_OUT message or an action set, a switch determines whether an identified action contains an experimenter at reference 702. If it does, the method 700 goes to reference 704, where the switch executes an action execution function using the function pointer specified by the experimenter. In other words, if the switch determines that an action contains an experimenter, the switch executes one or more of the set of functions identified by the vendor extension identifier matching the experimenter in the vendor extension table. If it does not, the method goes to reference 706 and the action is executed in a standard way. It is to be noted that one or more of the actions in the action set at reference 630 may contain an experimenter too, and the execution of the one or more of the actions includes operations in reference 704 in that case.

Additionally and optionally, if the switch determines that the instruction is a meter instruction with an experimenter band type at reference 714. If it does, the method 700 goes to reference 716, where the switch executes a meter band execution function using the function pointers specified by the experimenter. In other words, when the instruction is a meter instruction with the experimenter band type, the switch executing one or more of the set of functions identified by the vendor extension identifier matching the experimenter in the vendor extension table. If it does not, the method goes to reference 718, and the switch perform the meter instruction in a standard way specified in the OpenFlow™ protocol.

It is to be noted that each of the match field examination in reference 604, instruction examination in reference 612, action examination in reference 702, action set examination in reference 708, and meter instruction examination in reference 714 is to determine the existence of an experimenter. The experimenter may be the same experimenter, in which case the vendor extension has generated multiple experimenter matching; the experimenter may be different experimenters, in which case multiple vendor extensions may be generated for the multiple experimenter matching.

SDN and NFV Environment Utilizing Embodiments of the Invention

Figure 8A:
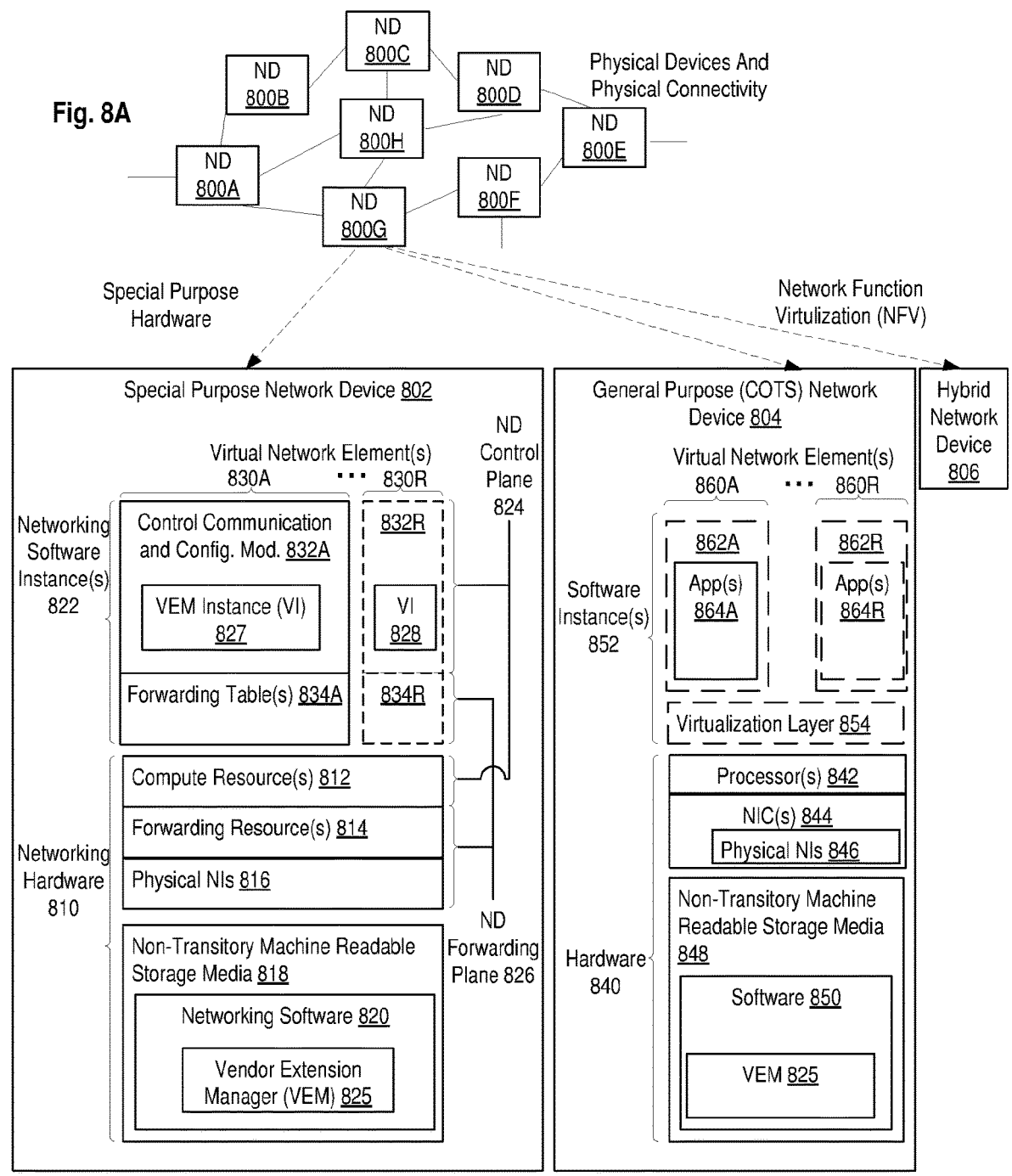
FIG. 8A illustrates connectivity between network devices (NDs) within an exemplary network, as well as three exemplary implementations of the NDs, according to some embodiments of the invention.

Embodiments of the invention may be utilized in a SDN and NFV network containing network devices. FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs). However, in some embodiments, NDs like the S-GW and P-GW are at the edge of connecting operator network but they are still referred to as core NDs and not edge NDs.

Two of the exemplary ND implementations in FIG. 8A are: 1) a special purpose network device 802 that uses custom application-specific integrated-circuits (ASICs) and a proprietary operating system (OS); and 2) a general purpose network device 804 that uses common off-the-shelf (COTS) processors and a standard OS.

The special purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A). The networking software 820 includes a vendor extension manager module 825, which has instance such as VEM instance 827 and 828 in VNE 830A and 830R respectively. The vendor extension manager 825 may perform operations discussed in methods 200, 400-700.

The special purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

Figure 8B:
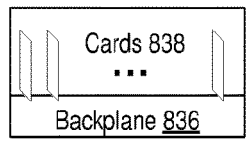
FIG. 8B illustrates an exemplary way to implement a special purpose network device according to some embodiments of the invention.

FIG. 8B illustrates an exemplary way to implement a special purpose network device according to some embodiments of the invention. FIG. 8B shows the special purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850, which may also contain the vender extension manager 825. During operation, the processor(s) 842 execute the software 850 to instantiate one or more sets of one or more applications 864A-R. While one embodiment does not implement virtualization, alternative embodiments may use different forms of virtualization. For example, in one such alternative embodiment the virtualization layer 854 represents the kernel of an operating system (or a shim executing on a base operating system) that allows for the creation of multiple instances 862A-R called software containers that may each be used to execute one (or more) of the sets of applications 864A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 854 represents a hypervisor (sometimes referred to as a virtual machine monitor (VMM)) or a hypervisor executing on top of a host operating system, and each of the sets of applications 864A-R is run on top of a guest operating system within an instance 862A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 840, directly on a hypervisor (in which case the unikernel is sometimes described as running within a LibOS virtual machine), or in a software container, embodiments can be implemented fully with unikernels running directly on a hypervisor represented by virtualization layer 854, unikernels running within software containers represented by instances 862A-R, or as a combination of unikernels and the above-described techniques (e.g., unikernels and virtual machines both run directly on a hypervisor, unikernels and sets of applications that are run in different software containers).

The instantiation of the one or more sets of one or more applications 864A-R, as well as virtualization if implemented, are collectively referred to as software instance(s) 852. Each set of applications 864A-R, corresponding virtualization construct (e.g., instance 862A-R) if implemented, and that part of the hardware 840 that executes them (be it hardware dedicated to that execution and/or time slices of hardware temporally shared), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 862A-R to VNEs also apply to embodiments where such a finer level of granularity and/or unikernels are used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 8C:
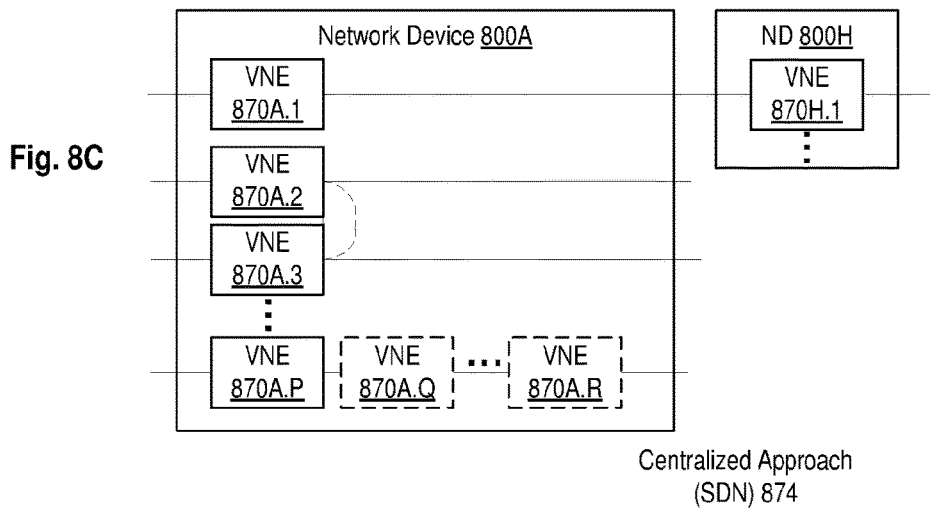
FIG. 8C illustrates various exemplary ways in which virtual network elements (VNEs) may be coupled according to some embodiments of the invention.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the virtual machines 862A-R may operate as servers; the same would be true for the hybrid network device 806; in the case of the special purpose network device 802, one or more such servers could also be run on a hypervisor executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 8D:
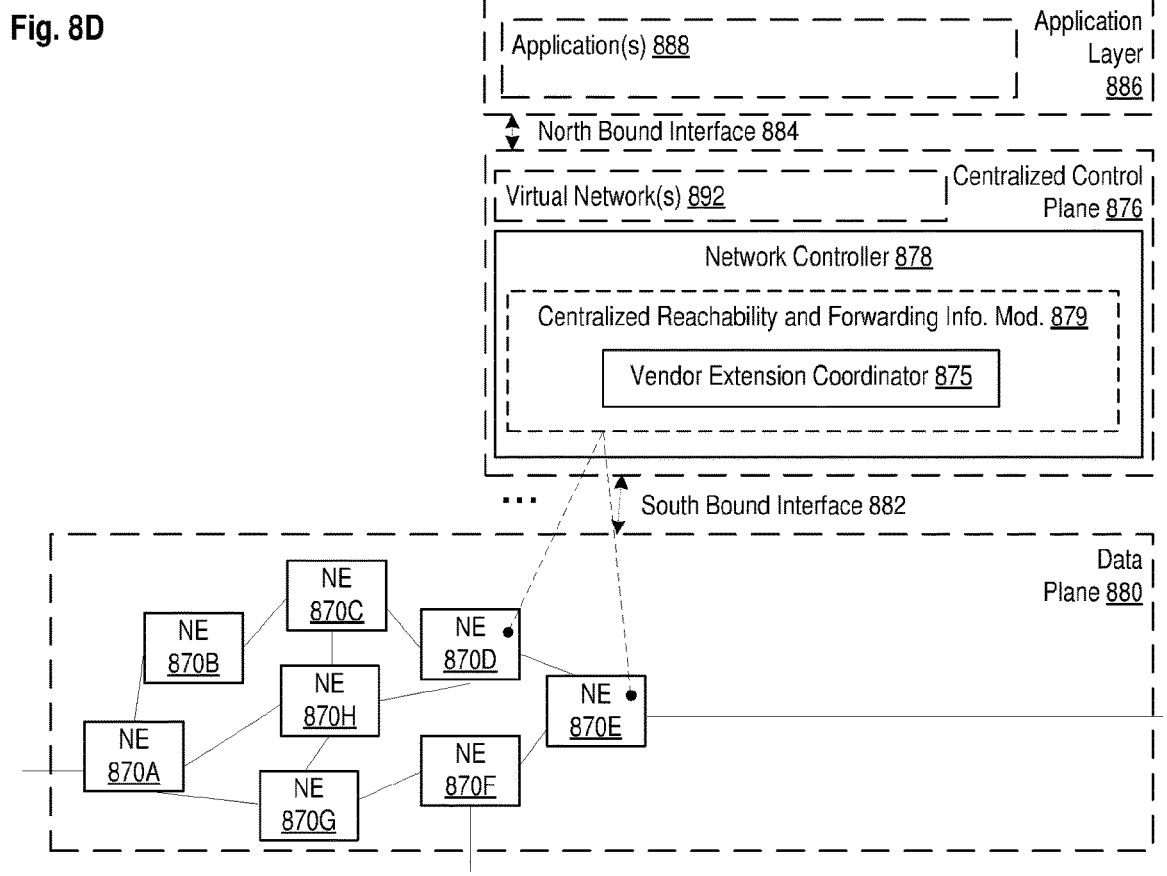
FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8D illustrates a network with a single network element on each of the NDs of FIG. 8A. Specifically, FIG. 8D illustrates network elements (NEs) 870A-H with the same connectivity as the NDs 800A-H of FIG. 8A with a centralized approach for maintaining reachability and forwarding information (also called network control), according to some embodiments of the invention.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow™ controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow™ protocol). The centralized reachability and forwarding information module 879 contains a vendor extension coordinator 875. The vendor extension coordinator 875 interacts with the vendor extension manager 825 and application 888, and performs operations of the network controller 878, similar to what has been discussed with regard to the network controller 178 in relation to FIG. 1.

The network intelligence is centralized in the centralized control plane 876 executing on electronic devices that are typically separate from the NDs. For example, where the special purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

Figure 8E:
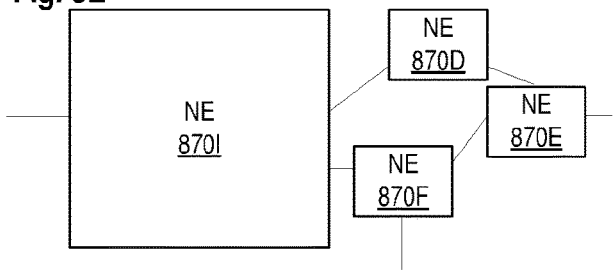
FIG. 8E illustrates the simple case of where each of the NDs implements a single NE, but a centralized control plane has abstracted multiple of the NEs in different NDs into (to represent) a single NE in one of the virtual network(s), according to some embodiments of the invention.
Figure 8F:
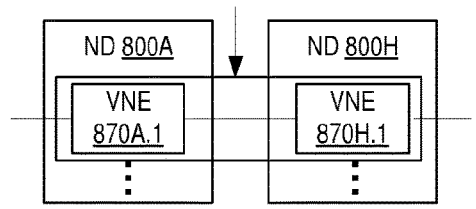
FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
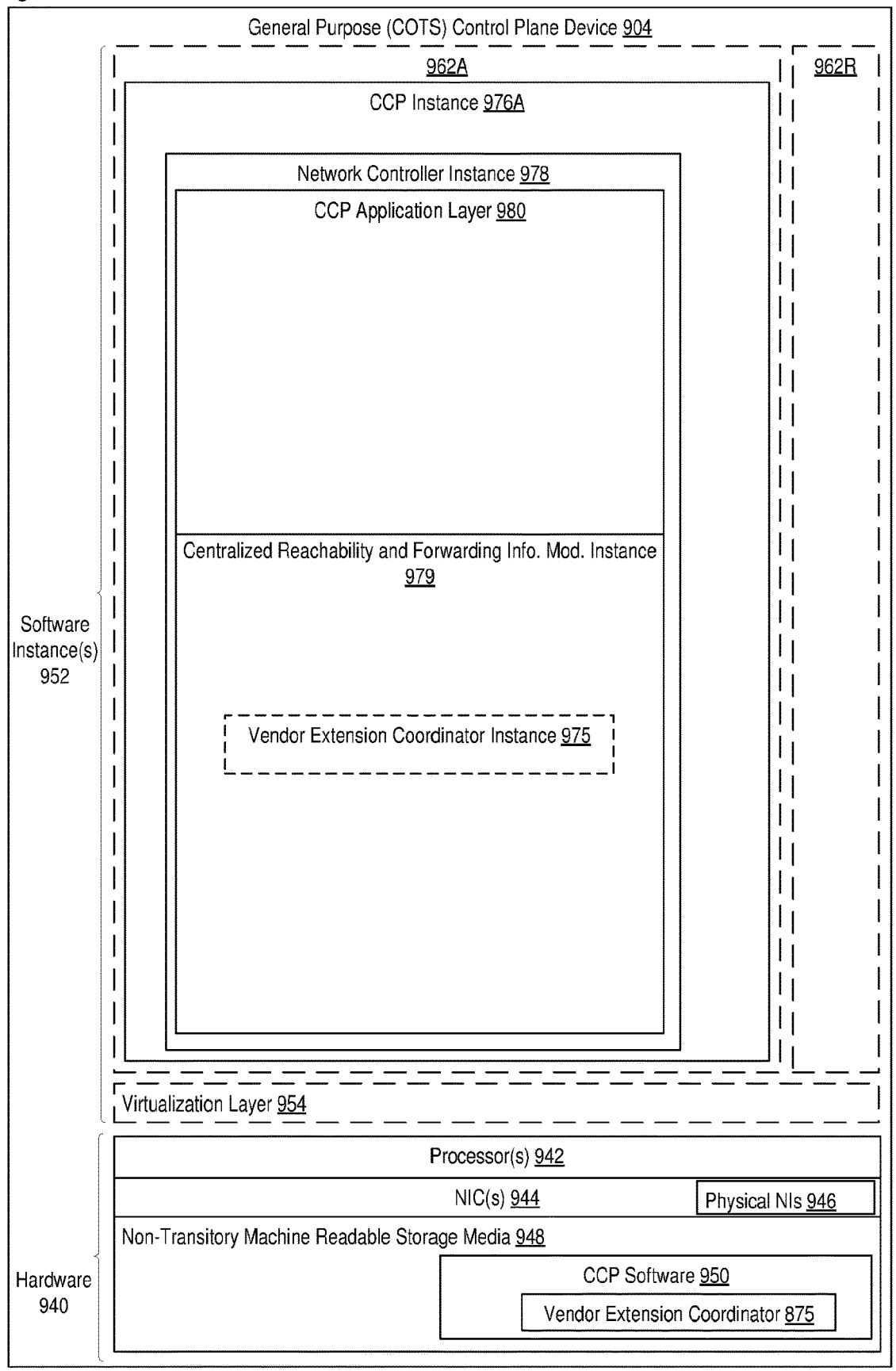
FIG. 9 illustrates a general purpose control plane device with centralized control plane (CCP) software according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950. The CCP software 950 includes the vendor extension coordinator 875 discussed herein above.

In embodiments that use compute virtualization, the processor(s) 942 typically execute software to instantiate a virtualization layer 954 and software container(s) 962A-R (e.g., with operating system-level virtualization, the virtualization layer 954 represents the kernel of an operating system (or a shim executing on a base operating system) that allows for the creation of multiple software containers 962A-R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 950 (illustrated as CCP instance 976A) is executed within the software container 962A on the virtualization layer 954. In embodiments where compute virtualization is not used, the CCP instance 976A on top of a host operating system is executed on the "bare metal" general purpose control plane device 904. The instantiation of the CCP instance 976A, as well as the virtualization layer 954 and software containers 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 978 to the operating system and communicating with the various NEs), and an CCP application layer 980 (sometimes referred to as an application layer) over the middleware layer (providing the intelligence required for various network operations such as protocols, network situational awareness, and user—interfaces). A vendor extension coordinator instance 975 is included in the CCP application layer 980 in one embodiment. At a more abstract level, this CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow™ define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow™ parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

The operations of the flow diagrams FIGS. 2 and 4-7 are described with reference to the exemplary embodiment of FIGS. 1, 8A-F and 9. However, it should be understood that the operations of flow diagrams can be performed by embodiments of the invention other than those discussed with reference to the exemplary embodiment of FIGS. 1, 8A-F and 9, and the exemplary embodiment of FIGS. 1, 8A-F and 9 can perform operations different than those discussed with reference to the flow diagrams of FIGS. 2 and 4-7.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in an electronic device in a software defined networking (SDN) system, wherein the electronic device serving as a network element in the SDN system, the method comprising:
 receiving a packet for forwarding;
 determining that the packet matches a flow table entry of a flow table in the network element; and
 performing operations on the packet based on one or more instructions of the flow table entry, wherein the one or more instructions contains an experimenter that matches a vendor extension identifier of a vendor extension table of the network element, wherein the vendor extension identifier of the vendor extension table corresponds to a vendor extension loaded by an application vendor based on their schedule without depending on a switch operator/vendor's software release timelines, wherein each vendor extension identifier of the vendor extension table identifies a set of function pointers pointing to one or more addresses for a set of functions for the vendor extension, and wherein the operations include execution of one or more of the set of functions.

2. The method of claim 1, wherein performing the operations on the packet comprises:
determining that within the flow table entry, an instruction contains the experimenter; and
executing one or more of the set of functions identified by the vendor extension identifier.

3. The method of claim 2, wherein the instruction is a meter instruction with an experimenter band type, the method further comprising:
executing one or more of the set of functions identified by the vendor extension identifier.

4. The method of claim 1, wherein performing the operations on the packet comprises:
determining that within the flow table entry, an action identified by an instruction contains the experimenter; and
executing one or more of the set of functions identified by the vendor extension identifier.

5. The method of claim 1, wherein performing the operations on the packet comprises:
upon determining that the flow table entry is within the last flow table of the network element, determining that an action set contains the experimenter;
ordering actions within the action set by executing one or more of the set of functions identified by the vendor extension identifier; and
executing the actions.

6. The method of claim 1, wherein prior to receiving the packet, the method further comprising:
receiving a message from a SDN controller;
processing an experimenter while unpacking the message, wherein the experimenter identifies the vendor extension identifier; and
executing one or more of the set of functions identified by the vendor extension identifier to process the experimenter; and
programming a forwarding plane of the network element based on the message.

7. The method of claim 6, wherein the message is one of a flow modify message, a group modify message, or a PACKET_OUT message.

8. The method of claim 1, wherein the vendor extension table is formed through:
loading the vendor extension in the form of dynamic linked library in the network element;
initiating an initialization function to get one set of function pointers for one set of functions for the vendor extension; and
storing the set of function pointers in the vendor extension table indexed by vendor extension identifiers of vendor extensions.

9. An electronic device serving as a network element in a software-defined networking (SDN) system, the electronic device comprising:
a processor and a non-transitory machine-readable storage medium that coupled to the processor, the non-transitory machine-readable storage medium containing instructions, which when executed by the processor, cause the electronic device to:
receive a packet for forwarding,
determine that the packet matches a flow table entry of a flow table in the network element, and
perform operations on the packet based on one or more instructions of the flow table entry,
wherein the instructions contains an experimenter that matches a vendor extension identifier of a vendor extension table of the network element, wherein the vendor extension identifier of the vendor extension table corresponds to a vendor extension loaded by an application vendor based on their schedule without depending on a switch operator/vendor's software release timelines, wherein each vendor extension identifier of the vendor extension table identifies a set of function pointers pointing to one or more addresses for a set of functions for the vendor extension, and wherein the operations include execution of one or more of the set of functions.

10. The electronic device of claim 9, wherein the performance of the operations on the packet is to:
determine that within the flow table entry, an instruction contains the experimenter, and execute one or more of the set of functions identified by the vendor extension identifier.

11. The electronic device of claim 10, wherein the instruction is a meter instruction with an experimenter band type, the electronic device is further to:
execute one or more of the set of functions identified by the vendor extension identifier.

12. The electronic device of claim 9, wherein the performance of the operations on the packet is to:
determine that within the flow table entry, an action identified by an instruction contains the experimenter, and
execute one or more of the set of functions identified by the vendor extension identifier.

13. The electronic device of claim 9, wherein the forming of the vendor extension table is to:
load the vendor extension in the form of a dynamic linked library in the network element,
initiate an initialization function to get one set of function pointers for one set of functions for the vendor extension, and
store the set of function pointers in the vendor extension table indexed by vendor extension identifiers of vendor extensions.

14. A non-transitory machine-readable storage medium having instructions stored therein, which when executed by a processor, cause the processor to perform operations in an electronic device in a software-defined networking (SDN) system, wherein the electronic device serves as a network element in the SDN system, the operations comprising:
receiving a packet for forwarding;
determining that the packet matches a flow table entry of a flow table in the network element; and
performing operations on the packet based on one or more instructions of the flow table entry, wherein the one or more instructions contains an experimenter that matches a vendor extension identifier of a vendor extension table of the network element, wherein the vendor extension identifier of the vendor extension table corresponds to a vendor extension loaded by an application vendor based on their schedule without depending on a switch operator/vendor's software release timelines, wherein each vendor extension identifier of the vendor extension table identifies a set of function pointers pointing to one or more addresses for a set of functions for the vendor extension, and wherein the operations include execution of one or more the set of functions.

15. The non-transitory machine-readable storage medium of claim 14, wherein performing the operations on the packet comprises:
determining that within the flow table entry, an instruction contains the experimenter; and
executing one or more of the set of functions identified by the vendor extension identifier.

16. The non-transitory machine-readable storage medium of claim 14, wherein prior to receiving the packet, the operations further comprises:
receiving a message from a SDN controller;
processing an experimenter while unpacking the message, wherein the experimenter identifies the vendor extension identifier;
executing one or more of the set of functions identified by the vendor extension identifier to process the experimenter; and
programming a forwarding plane of the network element based on the message.

17. The non-transitory machine-readable storage medium of claim 14, wherein the vendor extension table is formed through:
loading the vendor extension in the form of a dynamic linked library in the network element;
initiating an initialization function to get one set of function pointers for one set of functions for the vendor extension; and
storing the set of function pointers in the vendor extension table indexed by vendor extension identifiers of vendor extensions.

18. The method of claim 1, wherein determining that the packet matches the flow table entry comprises:
determining that match fields in the flow table include the experimenter; and upon matching the experimenter with the vendor extension identifier of the vendor extension table, executing the one or more of the set of functions identified by the vendor extension identifier for extracting match fields from the packet.

19. The electronic device of claim 9, wherein the determination that the packet matches the flow table entry is to:
determine that match fields in the flow table include the experimenter, and upon matching the experimenter with the vendor extension identifier of the vendor extension table, execute the one or more of the set of functions identified by the vendor extension identifier for extracting match fields from the packet.

20. The non-transitory machine-readable storage medium of claim 14, wherein determining that the packet matches the flow table entry comprises:
determining that match fields in the flow table include the experimenter; and upon matching the experimenter with the vendor extension identifier of the vendor extension table, executing the one or more of the set of functions identified by the vendor extension identifier for extracting match fields from the packet.

* * * * *